United States Patent [19]

La Rocca et al.

[11] Patent Number: 4,751,365
[45] Date of Patent: Jun. 14, 1988

[54] METHOD FOR BUTT WELDING TWO PIECES OF DIFFERENT METAL, PARTICULARLY PIECES OF MEDIUM OR HIGH CARBON CONTENT STEEL, WITH A LASER BEAM

[75] Inventors: Aldo V. La Rocca, Moncalieri; Guglielmo Capra, Piossasco; Maichi Cantello, Aglié, all of Italy

[73] Assignee: Fiat Auto S.p.A., Turin, Italy

[21] Appl. No.: 52,820

[22] Filed: May 22, 1987

[30] Foreign Application Priority Data

May 29, 1986 [IT] Italy ................ 67443 A/86

[51] Int. Cl.⁴ .................................... B23K 26/00
[52] U.S. Cl. .................. 219/121 LD; 219/121 LS
[58] Field of Search ............... 219/121 LC, 121 LD, 219/121 LS, 121 LT, 121 LA, 121 LB, 121 L, 121 LM, 121 EC, 121 ED, 121 PJ, 121 PK

[56] References Cited

U.S. PATENT DOCUMENTS 3,473,000 10/1969 Siekman et al. .............. 219/121 LD
3,949,186 4/1976 Nakayama et al. ....... 219/121 LC X
4,088,865 5/1978 Peters et al. .............. 219/121 LT X
4,088,890 5/1978 Waters ...................... 219/121 LC X
4,223,201 9/1980 Peters et al. ................. 219/121 LC
4,527,040 7/1985 Moon et al. ................... 219/118 X Primary Examiner—C. L. Albritton
Attorney, Agent, or Firm—Sughrue, Mion, Zinn, Macpeak and Seas

[57] ABSTRACT

A method for butt welding two metal pieces which are difficult to weld, particularly pieces of medium or high carbon content steel with the use of laser beams is accomplished by forming a groove in at least a surface of one of the pieces to be welded to define a pair of longitudinal ribs having flat frontal surfaces. The flat surfaces are placed against the surface of the other piece in welding position and the two ribs are welded simultaneously by means of opposed laser beams moving along the zone of contact between the ribs and the surface of the other piece. An alternate method involves the use of a sheet of welding material having an aperture therein which is located between the two pieces to be welded. The two laser beams move along opposite surfaces of the apertured sheet to weld the two pieces together by means of the intermediate sheet.

10 Claims, 3 Drawing Sheets

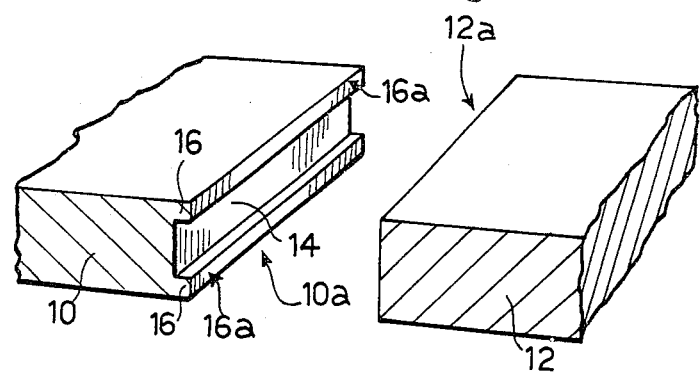
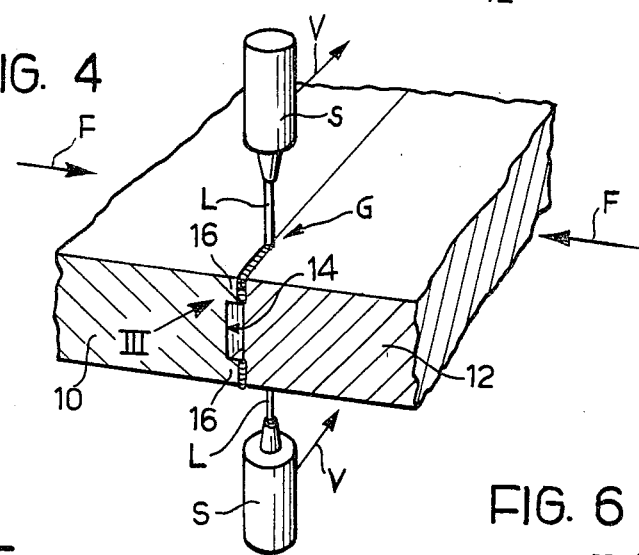
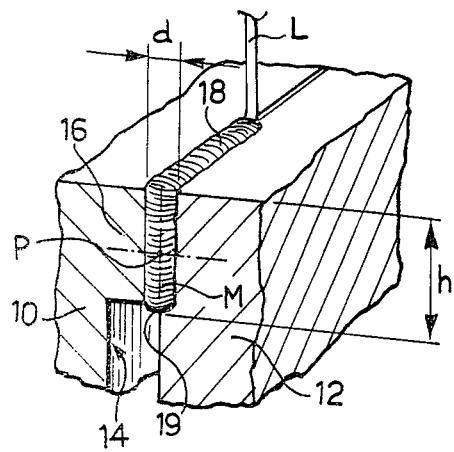
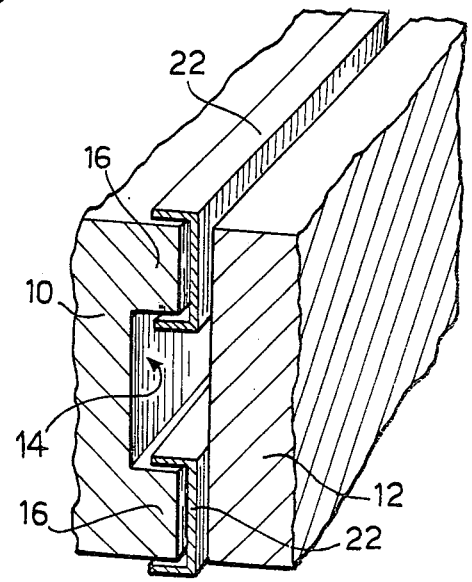

METHOD FOR BUTT WELDING TWO PIECES OF DIFFERENT METAL, PARTICULARLY PIECES OF MEDIUM OR HIGH CARBON CONTENT STEEL, WITH A LASER BEAM

BACKGROUND OF THE INVENTION

The present invention relates to a method for welding metal pieces.

More particularly, the invention concerns a method for the butt welding of two metal pieces which are difficult to weld, particularly pieces of different metals and more specifically of medium or high carbon content steel, with the use of a laser beam.

STATE OF THE ART

It is well known that the welding of metal pieces of medium or high carbon content steel is particularly difficult. Some difficulties arise from the evolution of carbon monoxide resulting from the reduction by the carbon of the iron oxide which may form during welding, and from a tempered structure resulting from the quick cooling of the weld and the surrounding zones. Moreover, the martensitic structure which results from the partial tempering has irregular grains at the interfaces of which impurities from low-solvents may separate, for example, small percentages of sulphur and phosphorous present in the commercial steels; these impurities involve the creation of microcracks. The latter differ from tempered structures resulting from welding in that they cannot be removed by subsequent reheating and like processes.

Such phenomena result in the welds in such steels being very fragile and reduces their usefulness, particularly for pieces which have to withstand considerable dynamic forces. On the other hand, steels having medium-high carbon contents are those most used for the manufacture of mechanical parts since they are easy to work, easy to temper, and relatively cheap.

It has been attempted to solve the problem of welding of medium-high carbon content steels both by conventional techniques, such as the MIG (metal inert gas), TIG (tungsten inert gas) and electron beam techniques, and by the recent laser welding method but satisfactory results have not been obtained. Hence, until now, the joining of parts of such steels has been achieved for the most part by screws or like mechanical fixing means which result in higher manufacturing costs and the consequent size limitations, difficulty of assembly, etc.

OBJECT OF THE INVENTION

The object of the present invention is to provide a method which enables the problem of welding of metal pieces which are difficult to weld, particularly pieces of medium or high content steel, to be solved with the use of a laser beam.

STATEMENT OF THE INVENTION

This object is achieved according to the present invention by means of a method characterised in that it comprises the steps of:

placing the surfaces of the pieces to be welded in mutual contact, directing at least one laser beam at homologous points of two opposite sides of the zone of contact of the surfaces of the two pieces, the beams having a power such as to enable deep-penetration welding with the formation of thin welds which have substantially constant sections and form solidification menisci with convex profiles.

For reasons which will become more apparent below, the use of two laser beams acting simultaneously on homologous points of the two sides of the zone of contact is advantageous from the point of view of the quality of the weld, the productivity and redundancy, and reliability of the system.

By virtue of the aforesaid characteristics, both the stresses within each weld, called "auto-stresses" below, and the stresses induced thereby in the pieces and/or in other welds, called "tele-stresses" below, are minimised.

The reduction in the auto-stresses and the tele-stresses reduces to a minimum the probability of there being dangerous cracks in the welding zones which cannot be eliminated by subsequent tempering/annealing of the pieces. These cracks would make the welded joint not very reliable, particularly for applications in which high dynamic stresses are foreseen.

The welds carried out by a high-power laser beam improve the efficiency of the process or the efficiency of welding, this being understood as the ratio between the energy needed to create a unit volume of weld and the energy absorbed by the pieces and transmitted through conduction to the pieces. This efficiency may reach particularly high values of the order of 80-90%.

With a suitable choice of the laser welding parameters, such as the power of the beam used and the speed of advance of the beam, it is possible to refine the base metal, that is, obtain a uniformly-distributed fine grain in the weld zone. The high temperature and recirculating movements of the molten metal induced by the high temperature gradients resulting from the high concentration of energy which can be obtained with a laser beam cause impurities to volatilize during the welding and the welds are free from such impurities, with a fine grained structure and consequent characteristics of uniformly hardness. Notwithstanding the great hardness, the welds have good characteristics for ductility and enable the use of welded pieces for applications in which considerable dynamic and fatigue stresses are foreseen.

In other words, the method achieves a stress-relieving action, the elimination of low-melting substances, refinement, and a uniformity of the grain structure, such that the resilience and strength of the welds obtained by the method of the invention, on the basis of tests carried out, are so satisfactory as to render almost any further subsequent stress-relieving heat treatment practically superfluous.

BRIEF DESCRIPTION OF THE DRAWINGS

Further characteristics and advantages of the invention will become apparent from the detailed description which follows with reference to the appended drawings, provided purely by way of non-limiting example, in which:

FIG. 3 is a schematic view showing another two pieces prepared for welding in another embodiment of the method of the invention, FIG. 4 is a schematic perspective view showing the pieces of FIG. 3 during welding, FIG. 5 is a detail of FIG. 4 on an enlarged scale, FIG. 6 is a schematic perspective view illustrating another embodiment of the method of the invention.

With reference to FIG. 1, a first steel piece with a high carbon content, for example C43 steel, is indicated 1 and is intended to be welded to a second piece, also of high carbon content steel, for example of the C33 type. The pieces 1 and 2 are placed with their surfaces to be welded together in mutual contact. The zonal area of contact between the surfaces of the pieces 1 and 2 is indicated 3.

Figure 1:
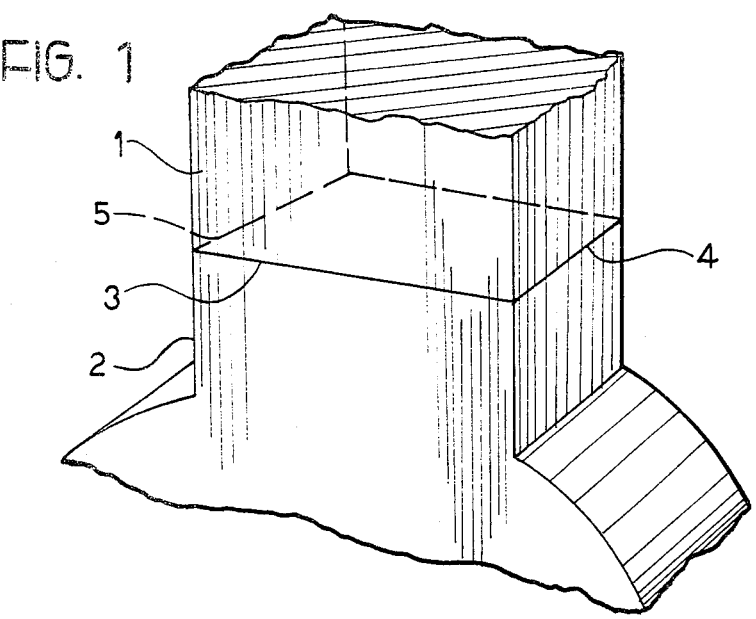
FIG. 1 is a perspective view showing two metal pieces before their welding by the method of the invention.
Figure 2:
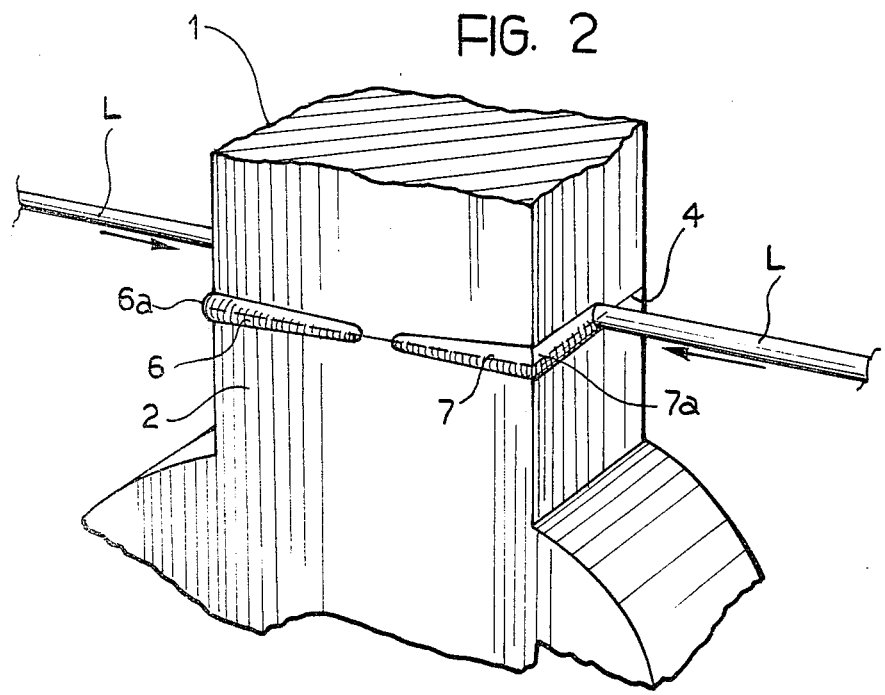
FIG. 2 illustrates the pieces shown in FIG. 1 during welding.

In a first embodiment of the method of the invention, two laser beams L with the same characteristics are directed at homologous points on two opposite sides 4 and 5 of the zone of welding 3, as shown in FIG. 2. The rates of advance of the laser beams L along the sides 4 and 5 of the zone of welding are preferably the same. The power of these beams is also such as to achieve deep-penetration welding with the formation of thin welds 6 and 7 having substantially constant sections and forming solidification menisci 6a and 7a with convex profiles.

As stated, the welds must penetrate deeply so as to form welds having the maximum possible slimness, that is the maximum depth/thickness ratio, and hence the minimum thickness (and volume) relative to the depth. For this purpose, however, it is necessary to stress that it is the depth of the weld which determines the strength of the weld. If the weld were metallurgically perfect, the weld could even be only a few hundred angstroms to make the structure formed by the two welded pieces effectively one piece. However, technological limitations, among which are the precision required to effect such a thin joint, make this limit unachievable.

The thickness of the weld is also of particular importance. This thickness must be as uniform as possible. This considerably reduces the stresses induced in the during its solidification, and thus achieves a minimum auto-stress. Tele-stresses induced by one weld on another are also considerably reduced.

The welds must be made, as stated above, with convex solidification menisci. This characteristic is extremely important. In fact, menisci fulfil essentially two extremely important functions: in the first place, they act as reserves of liquid material to be brought to the zones which solidify and in which it is necessary to compensate for shrinkage; furthermore, the menisci help create compressional stresses which improve the resistance to the formation of microcracks and cracks and fatigue stresses in general. Experiments carried out by the inventors have shown that if the weld parameters are such as to involve the formation of concave menisci, dangerous states of local tensional stresses are created in the weld. Cracks, microcracks and fragility of the welds result from these. In particular, the bead welds formed with concave menisci are incapable of withstanding strong external loads and particularly the tele-stresses induced by the other weld.

In FIG. 3, another two pieces of high carbon content steel are indicated 10 and 12 and are to be welded together along respective facing surfaces 10a and 12a. The surface 12a of the piece 12 is flat. A longitudinal groove 14 is formed in the surface 10a of the piece 10 and is defined laterally by two ribs 16 with substantially identical flat frontal surfaces 16a.

Before welding, the pieces 10 and 12 are brought together and clamped against each other, as shown by the arrows F in FIG. 4.

Two power laser sources S are then disposed on opposite sides of the zone of joining of the pieces 10 and 12, indicated G. These sources are moved parallel to the joint zone G, as indicated by the arrows V in FIG. 4. The laser beams L emitted by the sources achieve the simultaneous welding of each of the ribs 16 to the facing portions of the surface 12a of the piece 12.

As shown in particular in FIG. 5, the weld, indicated M, has a substantially rectangular section and forms external and internal solidification menisci 18, 19 with substantially convex profiles. These menisci result essentially from the forces acting on the molten metal (temperature gradients, vapour pressures, surface tensions, viscosity, and gravity) which make the molten part or weld M leave the zone of contact between the pieces. The convex menisci in practice eliminate dangerous tensional forces which would otherwise occur at the apices of the weld and contribute, as stated above, to the forcing of the free surface of the meniscis into compression during the solidification phase, a situation which prevents the formation of cracks and contributes to the improvements of the fatigue strength of the joint. As may be seen in FIG. 5, the aspect figure of the weld, a parameter defined as the ratio between the depth h of the weld and its width d, is particularly high and in any case is greater than 3.

By virtue of the almost rectangular section of the weld M, the auto-stresses are particularly low, in that the flow of heat from the weld to the pieces 10 and 12 is substantially in a single dimension, and in that the piece 12 is free to move towards the piece 10 and vice versa. Moreover, since the solidification of the molten metal M starts substantially from a point P at the centre of the molten metal itself, the tele-stresses transmitted from one weld to an adjacent weld are also minimised. In fact, if the solification were to start, for example, at the internal meniscus 19, the further molten parts M undergoing solidification would subject the weld forming around the already solidified meniscus 19 to tension. This would create tension in the weld adjacent the other rib 16.

Another way of carrying out the method of the invention provides for the use of a welding material in the form of a sheet to be inserted between the frontal surfaces 16a of the ribs 16 and the portions of the surface 12a of the piece 12 in contact with these ribs. In figure 6, two U-shaped sheets are indicated 22 and are constituted by a nickel-based alloy, for example Inconel. The sheets 22 are positioned on the ribs 16 of the piece 10 with their respective concavities facing the frontal surfaces 16a. These sheets may be fixed to the piece, for example, by spot welding.

To advantage, the sheets 22 are several tenths of a millimeter thick, particularly two tenths of a millimeter.

After the pieces 10 and 12 have been placed together, the welding is effected in a manner similar to that described previously.

The presence of the welding material in the form of the sheets 22 adds material to the molten metal M, reducing the percentage of carbon and extending the martensitic structure. Furthermore, it provides material for forming the convex menisci 18 and 19.

In addition, with the nickel alloys, the sheets 22 may be formed of low carbon content steel or stainless austenitic steel.

Figure 7:
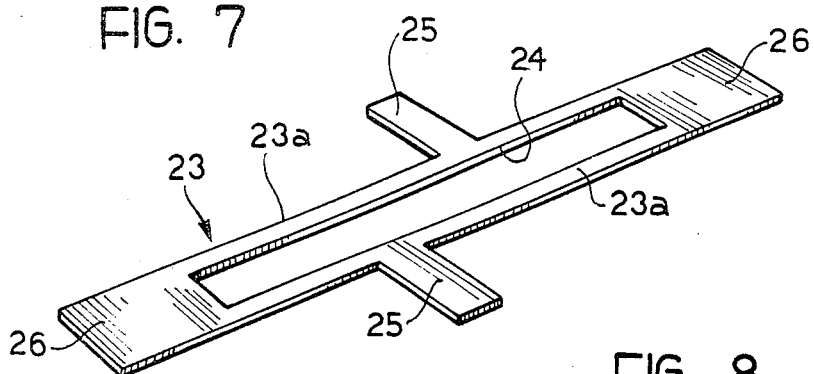
FIGS. 7 to 9 show a further embodiment of the method.
Figure 8:
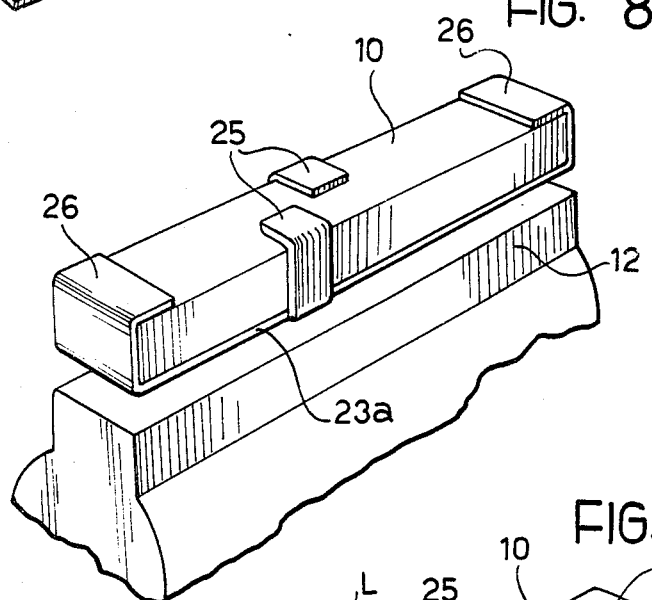

A further embodiment of the method of the invention will now be described with reference to FIGS. 7 to 9. FIG. 7 shows a sheet of welding material 23 having a rectangular aperture 24 and a plurality of bendable tabs or appendages 25 and 26. The sheet 23 is coupled to a piece 10 to be welded in the manner illustrated in FIG. 8: the portion of the sheet having the aperture 24 is applied to the face of the piece 10 intended to be welded to the other piece 12, and the tabs 25 and 26 are bent over the piece 10. By virtue of the clamping achieved, the sheet 23 is mechanically fixed to the piece 10, which is advantageous from the point of view of handling of the piece 10 and from a logistical point of view. The piece 10 is then placed againt the piece 12, as shown in FIGS. 8 and 9: the aperture 24 in the sheet 23 determines a spacing between the facing surfaces of the pieces 10 and 12 and, in practice, has the same function as the groove 14 formed in one of the pieces in the embodiment of the method explained with reference to FIGS. 3 to 5.

Figure 9:
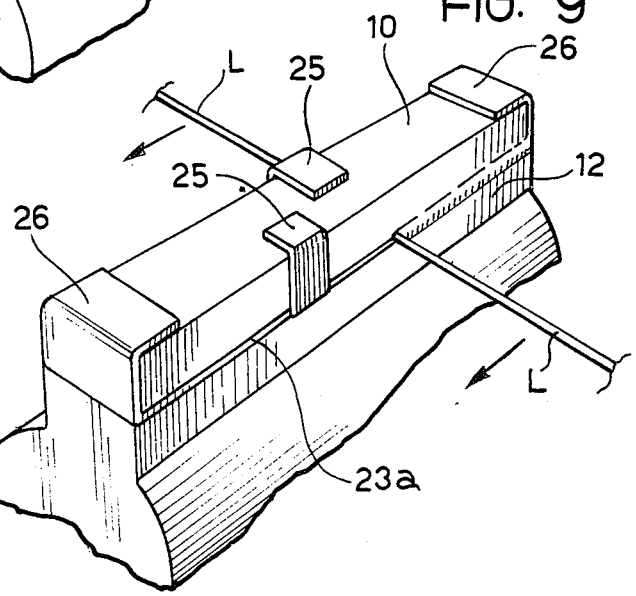

As shown in FIG. 9, two laser beams L are then directed at the junction zone of the pieces 10 and 12 and achieves the weld by fusing the longitudinal sides 23a of the sheet 23.

If the thickness of the piece to be welded, which has previously had the sheet of welded material coupled to it, is such that it is not convenient to fold the sheet, it is possible to form a groove in this piece in which the ends of the tabs of the sheet are engaged.

From experiments carried out by the inventors, it is found that the weld achieved by the method of the present invention, and in particular by the method explained with reference to FIGS. 3 to 5, is able to withstand extremely high static loads under tension and flexion. Two pieces welded in the manner illustrated with reference to FIGS. 3 to 5 with the use of a Spectra Physics 973 laser operating at a power of 1.5 KW, a translational speed of 2.5 m/min, and a penetration of 1.5 mm withstood static loads of 3000–4000 Kg.

Tests carried out on the same pieces with the Charpy pendulum showed that the structure welded in this manner had a very high resilience, even in the crude state without heat stress-relieving after welding.

It is thought that the optimum characteristics for the weld achieved depend on the fact that, if correctly carried out, the laser welding subjects the molten metal to a self-stress-relieving process. This process occurs during welding in substantially the following manner. The molten metal is subjected to a refining action. It is due to rapid antisymmetrical circulating movements (at frequencies of the order of 300–800Hz) with respect to the axis of the weld, which are induced in the deep-penetration weld by the invention of the temperature gradient (see A. V. La Rocca, "Laser welding in some mass-production industries", Proceedings of the International Conference on Laser '79, Orlando, Fla., U.S.A.—Dec. 1979, pages 61ss).

It is yet to be established whether the point of highest temperature is produced within the piece by the plasma.

The circular movements are directed towards the surface and bring with them the impurities which are exposed to the laser beam and, in effect, are made to sublime instantaneously. Further, cooling occurs rapidly (but is uniform, however, if the section of the weld is substantially constant) and result in a fine crystalline grain, also uniformly distributed. Hence, even if the material is hard or has a poor capacity for elongation, the grain is in any case distributed uniformly within the volume of the weld without having tension peaks. The material may then withstand greater elongation without breaking. In other words the weld, being self-stress-relieved during the process, exhibits properties which are entirely similar, and even better, than those of a weld which has been stress-relieved by heating after the process.

Naturally, the principle of the invention remaining the same, the forms of embodiment and details of realisation may be varied widely with respect to that described and illustrated purely by way of non-limiting example, without thereby departing from the scope of the present invention.

What is claimed is:

1. A method for butt welding two metal pieces which are difficult to weld, particularly pieces of medium or high carbon content steel, with the use of laser beams, comprising the steps of:

forming at least one longitudinal groove in a surface of one of the pieces to be welded which is intended to be welded to a surface of the other piece so as to define a pair of longitudinal ribs having flat frontal surfaces, placing the frontal surfaces of the rib in contact with the surface of the other piece in a welding position, welding the ribs of one piece to the other piece by means of opposed laser beam, each of which is made to be incident on the zone of contact between a rib on one piece and the surface of the other piece.

2. The method according to claim 1, further comprising welding one piece to the other piece simultaneously by means of two laser beams having the same characteristics and speed of advance relative to the pieces along the junction zone of the pieces, wherein the frontal surfaces of said ribs are equal to each other.

3. The method according to claim 1, further comprising clamping said pieces against each other during the welding with a force such that, after welding, each junction zone between a rib of one piece and the edge of the other piece has a weld with a meniscus having a convex profile.

4. The method according to claim 1, further comprising operating the laser beams at a power between $2.10^5$ Watts/CM$^2$ and $9.10^6$ Watts/CM$^2$.

5. The method according to claim 1, further comprising advancing the laser beams relative to the pieces at a speed between 1 m/minute–5 m/minutes and wherein the ratio of depth of the weld to the width of the weld is at least equal to 3.

6. A method for butt welding two metal pieces which are difficult to weld, particularly pieces of medium or high carbon content steel, with the use of laser beams, comprising the steps of:

placing a shaped sheet of welding material having an aperture therein between said two pieces, affixing said shaped sheet to a surface of one of the pieces and placing a surface of the other piece to be welded in contact with said shaped piece, and directing two laser beams at homologous points on opposite sides of the zone of contact of the surfaces of the two pieces with said shaped sheet of welding material, said beams having a power such as to enable deep-penetration welding with the formation of thin welds having substantially constant sections and forming solidification menisci with convex profiles.

7. The method according to claim 6, wherein the shaped sheet is of stainless austenitic steel.

8. The method according to claim 6, wherein the shaped sheet is of a nickel-based metal alloy.

9. The method according to claim 6, wherein the securement of the shaped sheet to one of the pieces to be welded is by spot welding.

10. The method according to claim 6, wherein the shaped sheet has a plurality of tabs and the securement of said sheet to one of said pieces to be welded is achieved by bending the tabs about said piece to anchor the sheet to said piece.

* * * * *